March 3, 1942. O. J. HORGER 2,274,961
PROCESS OF PRODUCING WHEEL AND AXLE ASSEMBLIES
Filed Oct. 14, 1938
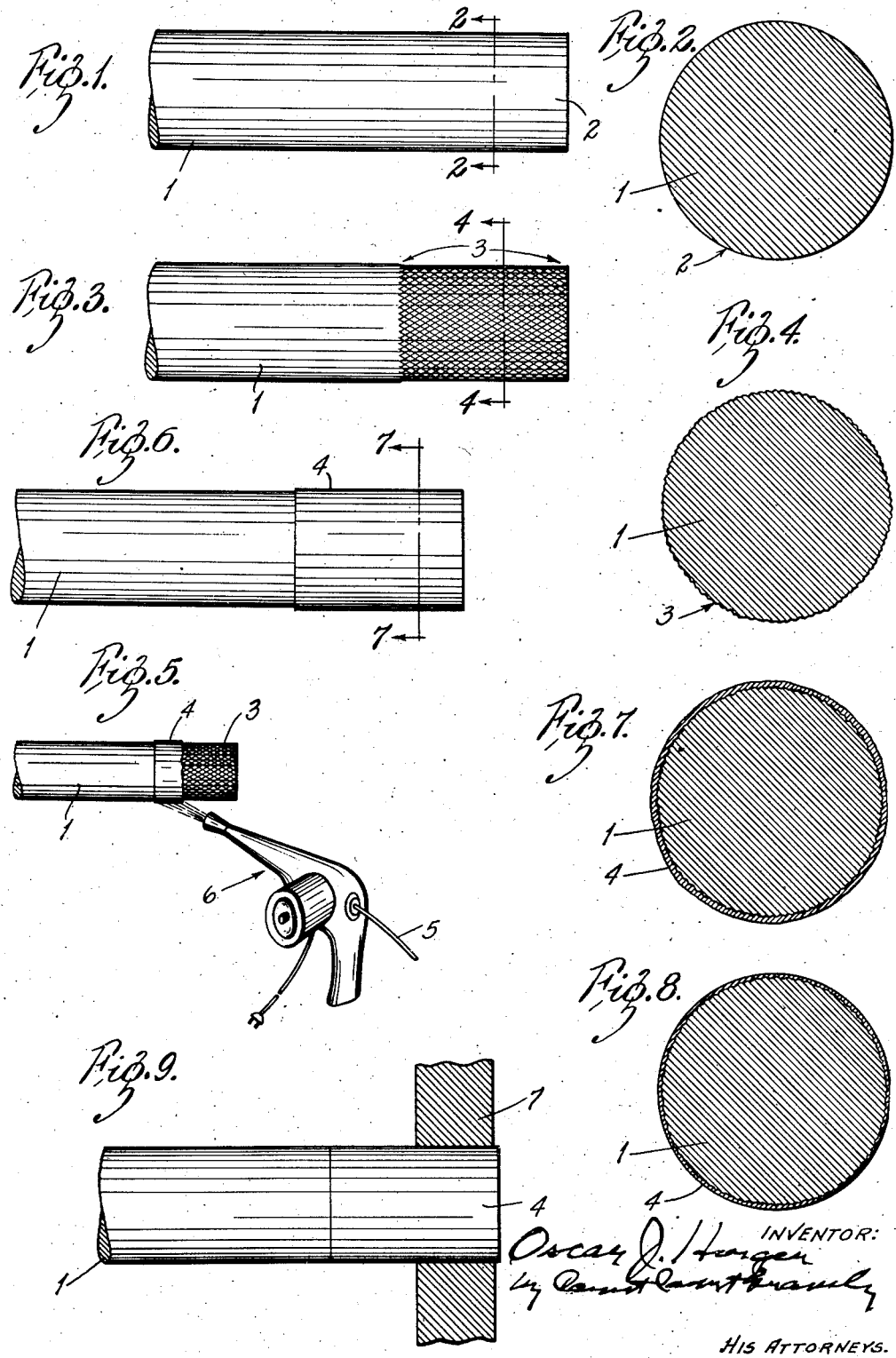

Patented Mar. 3, 1942

2,274,961

UNITED STATES PATENT OFFICE 2,274,961

PROCESS OF PRODUCING WHEEL AND AXLE ASSEMBLIES

Oscar J. Horger, Canton, Ohio, assignor to The Timken Roller Bearing Company, Canton, Ohio, a corporation of Ohio Application October 14, 1938, Serial No. 234,871

7 Claims. (Cl. 29—165)

In modern practice, car wheels and especially locomotive wheels are mounted on their axles by press fitting with very high pressure and this fact, together with severe service conditions, has caused axles to fracture by fatigue just inside the inner end of the wheel hub. The purpose of the present invention is to increase the fatigue strength of such axles, and the invention consists mainly in metallizing the wheel seat portion of the axle prior to press fitting the wheel thereon.

In the accompanying drawing,

Fig. 1 is an elevation of a portion of an axle prior to modification by my process, Fig. 2 is a sectional view on the line 2—2 in Fig. 1, Fig. 3 is a view of said axle with the end or wheel seat portion knurled or roughened, Fig. 4 is a sectional view on the line 4—4 in Fig. 3, Fig. 5 is an elevation of the axle of Fig. 3 showing the spraying of molten metal thereon, Fig. 6 is a view of the axle after the metallized coat has been completed, Fig. 7 is a sectional view on the line 7—7 in Fig. 6, Fig. 8 is a similar sectional view after the axle of Figs. 6 and 7 has been turned or otherwise finished; and Fig. 9 is a view of the axle with a wheel applied thereto, only a portion of the wheel being shown and in section.

In carrying out my process, I start with a steel axle 1 of ordinary composition and dimensions. I roughen the wheel seat portion 2 of this axle by any suitable process, such as knurling, sand blasting or blasting with steel chips; and I extend the area 3 of roughening somewhat beyond the limit of the wheel seat, say, one-quarter of an inch or more. I then metallize the roughened portion to provide a coat 4 of added metal of substantial thickness, say about $\frac{1}{32}$ of an inch thick. For the purpose of metallizing, it is desirable to use steel wire 5 of a suitable composition by feeding it to an oxyacetylene torch 6 to melt it and to spray or nebulize the molten metal by means of an air blast back of the flame and directed toward the wheel seat portion of the axle. During this operation of spraying, the axle is preferably mounted in a lathe (not shown) and rotated on its axis until the metallized coat 4 reaches the predetermined thickness. I have found stainless steel wire to be suitable material for metallizing but even better results have been obtained by the use of steel wire containing 1.2% of carbon.

After the metallizing operation, the outer portion of the metallized coat 4 is removed, by turning or grinding, to true the surface thereof and reduce it to the predetermined diameter shown in Figs. 8 and 9. A wheel 7 is then press fitted thereon with the requisite pressure and, as the metallized coat is longer than the hub of the wheel, such coat projects somewhat beyond the inner end of the hub.

I have found by careful tests that the fatigue strength of an axle metallized as heretofore described is very materially greater than the fatigue strength of an unmetallized axle of the same steel and wheel seat diameter.

What I claim is:

1. The process which consists in spraying molten metal onto the wheel seat portion of a steel axle to form a thin metal coat thereon and press fitting a wheel onto the metal coated wheel seat, whereby the fatigue strength of said coated axle is increased materially above the fatigue strength of an uncoated axle of the same wheel seat diameter.

2. The process which consists in roughening the wheel seat portion of a steel axle, spraying molten metal onto said roughened portion to form a thin metal coating thereon, and press fitting a wheel onto the metal coated wheel seat, whereby the fatigue strength of said coated axle is increased materially above the fatigue strength of an uncoated axle of the same wheel seat diameter.

3. The process of increasing the fatigue strength of press fitted axles which consists in roughening the wheel seat portion of a steel axle, spraying molten steel containing 1.20 per cent carbon onto said roughened portion to form a thin metal coating and press fitting a wheel onto the metal coated wheel seat.

4. The process which consists in metallizing the wheel seat portion of a steel axle with a thin coat of steel containing about 1.20 per cent of carbon sprayed thereon and then press fitting a wheel on said metallized portion.

5. The process which consists in metallizing the wheel seat portion of a steel axle with a thin coat of high carbon steel sprayed thereon, removing the surface portion of said coat to reduce the metallized portion to a predetermined diameter and then press fitting a wheel on said metallized portion, whereby the fatigue strength of said coated axle is increased materially above the fatigue strength of an uncoated axle of the same wheel seat diameter.

6. The process which consists in spraying molten metal on to the wheel seat portion of an axle to form a thin metal coating thereon and then removing the outer portion of said coating to reduce said wheel seat portion to a predetermined diameter preparatory to pressfitting a wheel on said axle.

7. The process of increasing the fatigue strength of pressfitted axles which consists in roughening the wheel seat portion of a steel axle, spraying molten steel containing 1.20 per cent of carbon onto said roughened portion to form a thin metal coating and then removing the outer portion of said coating to a predetermined diameter preparatory to pressfitting a wheel thereon.

OSCAR J. HORGER.